United States Patent Office 3,021,258
Patented Feb. 13, 1962

3,021,258
DIPHENYL SULFIDE NEMATOCIDE
Harry L. Haynes, Irvington, N.Y., assignor to Union Carbide Corporation, a corporation of New York
No Drawing. Filed Oct. 6, 1958, Ser. No. 765,310
2 Claims. (Cl. 167—30)

This invention relates to a method and composition of controlling nematodes. More particularly, the present invention relates to nematocidal processes and compositions for the control of nematodes employing certain diaryl sulfides.

Growers of fruit, vegetable, ornamental, grain and forage crops are faced with many plant disease problems. One group of diseases, caused by the plant parasitic nematodes, is particularly troublesome. Plant parasitic and free-living nematodes occur in large numbers in all kinds of soil in which plants grow. Most of those living in the soil are harmless but several hundred species feed on living plants and cause a variety of plant diseases. Infection of underground plant parts is most frequent but infection of stems, leaves and flower parts also occur. The feeding of a nematode may kill plant cells or interfere with its normal functioning. Killed cells are often invaded by bacteria or fungi. The most common types of nematode injury observed are the rotting of attacked parts or the development of galls and other abnormal growths. Either interferes with the functioning of the plants.

Volatile materials such as mixed dichloropropanes and dichloropropenes, ethylene dibromide and combinations of these materials have been widely used as fumigants for the control of nematodes. In more recent years, sodium methyldithiocarbamate and other similar compounds which decompose in the soil and release a volatile toxicant, have been developed for nematode control. However, all of these materials are extremely phytotoxic which necessitates a waiting period of two to three weeks following application before a crop can be planted without danger of being injured.

We have discovered that toxicants selected from a group of diphenyl sulfide, bis(p-chlorophenyl-sulfide and p-chlorobenzyl-p-chlorophenyl sulfide, either separately or in combination with a carrier, are outstandingly effective toxicants for the control of nematodes. When used at concentrations necessary for nematode control, these compounds are non-injurious to many established plants or plant seeds. We have also discovered a method of treating nematode-infested soil which comprises dispersing a quantity of a nematocidal composition containing a toxicant selected from a group consisting of diphenyl sulfide, bis(p-chlorobenzyl) sulfide and p-chlorobenzyl-p-chlorophenyl sulfide. We have also discovered a nematocidal composition comprising a carrier and a toxicant selected from a group consisting of diphenyl sulfide, bis(p-chlorophenyl) sulfide and p-chlorobenzyl-p-chlorophenyl sulfide. Thus, at dosages required for nematode control, seeds, vegetable transplants or woody plants can be put into the soil immediately after soil treatment. This is a distinct advantage over other known nematocides where a waiting period of two to three weeks is necessary to avoid plant injury. The compositions used in this invention have a further advantage in that they have a low mammalian toxicity, making them safe for the operator applying them for nematode control. A further advantage of the use of the compositions in this invention is that they provide the grower with a low cost, safe and effective means of controlling plant parasitic nematodes.

The toxicants of the present invention can be formulated in any of the forms needed to distribute them effectively in the soil. Compositions may be prepared as dusts, granular powder, wettable powders, emulsion concentrations or in organic solvents. All these preparations may be further diluted in dusts, aqueous or organic carriers. In the case of dusts, water emulsions or organic solvent applications to the soil surface, the materials should be mixed into the soil to a depth of 6–12 inches with appropriate farm equipment. Dissolved in a volatile organic solvent, they can be injected in the soil.

The exact quantity of toxicant utilized in a nematocidal composition will be found to vary rather widely and to a certain extent depends upon the type of compositions in which the material is being employed, method of application, nature of the nematocide to be controlled, soil texture and other factors commonly encountered in the nematocidal art. Concentrations as low as 2.25 percent may be employed. In general, however, compositions containing in the range from 5.7 to 22.7 percent by weight, in either a liquid or solid carrier, give excellent results. The amount of toxicant per acre can range within 22.5 pounds per acre to 360 pounds per acre for control and treatment of nematocide infested soils. However, the most effective range is 57 pounds per acre to 227 pounds per acre. Liquid carriers which may be employed include water, mineral oils and organic solvents, such as petroleum distillates of the kerosene type, suitable naphthas and the like, as well as other solvents or suspending agents. Solid carriers which may be employed include talc, bentonite, diatomaceous earth silica, pyrophyllite, fuller's earth, lime, gypsum, flours derived from cotton seeds, and walnut shells, or any other similar powder.

The effectiveness of p-chlorobenzyl-p-chlorophenyl sulfide, diphenyl sulfide and bis(p-chlorophenyl) sulfide as toxicants for the control of nematodes is demonstrated by the following experiments.

In the experiments, the compounds were formulated by a standard procedure which included dissolving the toxicant in acetone, adding an emulsifier and diluting with water. The actual concentration of the toxicants in the soil in these experiments were calculated on a pound per six inch acre slice.

Infective migratory larvae of the root-knot nematode, *Meloidogyne incognita* var. *acrita* reared in a greenhouse on roots of Rutgers variety tomato plants constituted the test organism employed in the experiments. Infected tomato plants were removed from the culture and the infected roots were finely chopped. A small amount of this inoculum was added to 3 or 5 inch clay pots containing approximately 180 cc. and 900 cc. of loam soil respectively. The pots were watered and incubated for one week at room temperature. During this period, eggs of the nematode hatched and the larval forms migrated into the soil.

Twenty-five (25) ml. of the test formulation prepared as described above were added to each of the pots for each dosage tested. The toxicant test formulation was then thoroughly incorporated in the soil by shaking the contents of the pots vigorously in paper bags, after which the soil was again returned to the pots and water sealed i.e. water added to the surface of the pot.

After water sealing, the pots were kept moist at room temperature for 10 days. Subsequently, the pots were seeded with cucumber of the variety National Pickling as an indicator crop and placed in the greenhouse where they were cared for in the normal fashion for approximately 3 weeks. The cucumber plants were then removed from the pots, the soil was washed from the roots and the amount of galling was visually rated.

The rates of application and the results obtained in these experiments are given in Table I below.

TABLE I

*Control of root-knot nematode species on soil treated with diphenyl sulfide, p-chlorobenzyl-p-chlorophenyl sulfide and bis(p-chlorophenyl) sulfide*

| Compound | lbs./acre | Rating [1] |
|---|---|---|
| p-chlorobenzyl-p-chlorophenyl sulfide | 227 | no galling—perfect control. |
|  | 114 | light galling. |
|  | 57 | moderate galling. |
| diphenyl sulfide | 227 | no galling—perfect control. |
|  | 114 | Do. |
|  | 57 | very light galling. |
| bis(p-chlorophenyl) sulfide | 227 | no galling—perfect control. |
|  | 114 | very light galling. |
|  | 57 | light galling. |
| Control |  | severe galling. |

[1] Prevention of galling on cucumber seedling roots indicates kill of nematodes.

As used herein, unless otherwise specified, all parts and percentages are by weight.

It can be seen from Table I that excellent nematocide control is given by diphenyl sulfide, p-chlorobenzyl-p-chlorophenyl sulfide and bis(p-chlorophenyl) sulfide without any chemical injury to the plants.

What is claimed is:
1. The method of controlling nematodes which comprises exposing said nematodes to a nematocidal composition comprising a carrier and as the toxicant, diphenyl sulfide.
2. The method of treating nematode-infested soil which comprises dispersing in the soil a quantity of diphenyl sulfide.

References Cited in the file of this patent

UNITED STATES PATENTS

| | | |
|---|---|---|
| 1,982,909 | Flint | Dec. 4, 1934 |
| 2,057,044 | Meisenburg | Oct. 13, 1936 |
| 2,102,200 | Dougherty | Dec. 14, 1937 |
| 2,377,466 | Payne | June 5, 1945 |
| 2,448,265 | Kagy | Aug. 31, 1948 |
| 2,502,244 | Carter | Mar. 28, 1950 |
| 2,543,580 | Kay | Feb. 27, 1951 |
| 2,572,898 | Woodward | Oct. 30, 1951 |
| 2,623,838 | Bender | Dec. 30, 1952 |
| 2,726,485 | Thomas | Dec. 13, 1955 |
| 2,730,547 | Dye | Jan. 10, 1956 |
| 2,743,209 | Jones | Apr. 24, 1956 |
| 2,770,568 | Greenwood | Nov. 13, 1956 |
| 2,779,680 | Wolf | Jan. 29, 1957 |
| 2,909,457 | Birum | Oct. 26, 1959 |

FOREIGN PATENTS

| | | |
|---|---|---|
| 452,507 | Italy | Oct. 28, 1949 |

OTHER REFERENCES

625 O.G. 840; 633 O.G. 300.

King: U.S. Dept. Agr. Handbook No. 69, May 1954, page 319.